US008676557B2

(12) United States Patent
Ding et al.

(10) Patent No.: US 8,676,557 B2
(45) Date of Patent: Mar. 18, 2014

(54) METHOD OF DEVELOPING A PETROLEUM RESERVOIR FROM OPTIMIZED HISTORY MATCHING

(75) Inventors: Didier Yu Ding, Le Pecq (FR); Frédéric Roggero, Rueil Malmaison (FR)

(73) Assignee: IFP, Rueil-Malmaison (FR)

(*) Notice: Subject to any disclaimer, the term of this patent is extended or adjusted under 35 U.S.C. 154(b) by 755 days.

(21) Appl. No.: 12/853,703

(22) Filed: Aug. 10, 2010

(65) Prior Publication Data
US 2011/0054859 A1  Mar. 3, 2011

(30) Foreign Application Priority Data

Aug. 26, 2009 (FR) ..................................... 09 04083

(51) Int. Cl.
*G06G 7/48* (2006.01)

(52) U.S. Cl.
USPC ........................................................... 703/10

(58) Field of Classification Search
USPC ........................................................... 703/10
See application file for complete search history.

(56) References Cited

U.S. PATENT DOCUMENTS

| 6,230,101 B1 | 5/2001 | Wallis |
| 7,363,163 B2 * | 4/2008 | Le Ra Valec-Dupin et al. ............................... 702/12 |

OTHER PUBLICATIONS

Roggero, F. and Hu, L.Y.: "Gradual Deformation of Continuous Geostatistical Models for History Matching", Paper SPE 49004, Proc. SPE Annual Technical Conference and Exhibition, New Orleans, USA, 1998.

Gosselin, O., Cominelli, A. van den Berg, S. and Chowdhury, S.D.: "A Gradient-Based Approach for History-Matching of Both Production and 4D Seismic Data", Proceeding $7^{th}$ European Conference on the Math. of Oil Recovery, Baveno, Italy, Sep. 8, 2000, pp. 1-8.
Cheng, H., Wen, X., Milliken, W.J. and Datta-Gupta, A.: "Field Experiences with Assisted and Automated History Matching Using Streamline Models", Paper SPE 89857, SPE ATC&E, Houston, TX, USA, 2004, pp. 1-16.
Roggero, F., Ding, D.Y., Berthet, P., Lerat, O., Cap, J. and Schreiber, P.E.: "Matching of Production History and 4D Seismic Data—Application to the Girassol Field, Offshore Angola", Paper SPE 109929, SPE ATC&E, Anaheim, California, USA 2007, pp. 1-20.
Mohamed, L., Christie, J. and Demyanov, V.: "Comparison of Stochastic Sampling Algorithms for Uncertainty Quantification", Paper SPE 119139 presented at SPE Reservoir Simulation Symposium, Houston, Feb. 2-4, 2009, pp. 1-12.

(Continued)

*Primary Examiner* — Saif Alhija
(74) *Attorney, Agent, or Firm* — Antonelli, Terry, Stout & Kraus, LLP.

(57) ABSTRACT

A method of developing a petroleum reservoir from a reservoir model and optimized history matching is disclosed having application for petroleum reservoir characterization. A global objective function measuring the differences between the measured historical data and the simulated historical data is defined according to M parameters. The global objective function is then decomposed into a sum of k local objective functions. Each local objective function measures the differences on a geographic region from $m_k$ parameters, selected from among the M parameters, and having a significant impact on the historical data of the region. The region is determined by minimizing this number $m_k$ of parameters. The model is then modified by minimizing the global objective function by a gradient method wherein the derivatives of the local objective functions are estimated by means of a parameter perturbation technique. For each local objective function, the perturbation matrix has a rank equal to the number of parameters $m_k$ of the local objective function. Finally, the calibrated model is used to develop the reservoir.

28 Claims, 10 Drawing Sheets

(56) References Cited

OTHER PUBLICATIONS

Feraille, Mathieu and Roggero, F.: "Uncertainty Quantification for Mature Field Combining the Bayesian Inversion Formalism and Experimental Design Approach", 9$^{th}$ European Conf. On the Math. Of Oil Recovery, Cannes, France, Aug. 30-Sep. 2, 2004, pp. 1-8.

Maschio, C. and Schiozer, D.J.: "A New Methodology for Assisted History Matching Using Independent Objective Functions", Petroleum Science and Technology, v. 26, n. 9, p. 1047-1062, Jun. 2008.

Sinoquet, D. and Delbos, F.: "Adapted Nonlinear Optimization Method for Production Data and 4D Seismic Inversion", Proceeding of 11$^{th}$ European Conference on Mathematics of Oil Recovery, Bergen, Norway, Sep. 8-11, 2008, 9 pgs.

Ding, D-Y., et al; "Local Parameterization of Geostatistical Realizations for History Matching", SPE Reservoir Simulation Symposium Proceedings—SPE Reservoir Simulation Symposium 2009, 2009 Society of Petroleum Engineers USA, vol. 1, Feb. 4, 2009, pp. 550-566, XP002579939.

Hu, L. Y., et al: "Elements for an Integrated Geostatistical Modeling of Heterogeneous Reservoirs", Revue De L'Institut Francais Du Petrole Editions Technip. Paris, FR. LNKD-DOI:10.2516/OGST:2004011, vol. 59, No. 2, Jan. 1, 2004, pp. 141-155, XP002520429, ISSN: 1294-4475.

Reis, L.C., et al: "Production Data Integration Using a Gradual Deformation Approach: Application to an Oil Field (Offshore Brazil)", Proceedings of the European Petroleum Conference, XX, XX, Oct. 2000, pp. 31-43, XP008021532.24, Maschio, C., et al: "A New Methodology for Assisted History Matching Using Independent Objective Functions", Petroleum Science and Technology, Marcel Dekker, New York, NY, US LNKD-D0I:10.1080/10916460701208389, vol. 6, No. 9, Jun. 1, 2008, pp. 1047-1062, XP009126957, ISSN: 1091-6466.

\* cited by examiner

METHOD OF DEVELOPING A PETROLEUM RESERVOIR FROM OPTIMIZED HISTORY MATCHING

BACKGROUND OF THE INVENTION

1. Field of the Invention

The present invention relates to the petroleum industry, and particularly to the characterization of petroleum reservoirs by constructing a representation of the reservoir referred to as a "reservoir model."

2. Description of the Prior Art

Optimization and development of petroleum reservoirs is based on the most accurate possible description of the structure, of the petrophysical properties, of the fluid properties, etc., of the reservoir. A tool which accounts for these two aspects is used in an approximate way. It is a model of the subsoil, representative both of its structure and of its behavior. Generally, this type of model is represented in a computer, it is then referred to as a numerical model.

These models, which are well known and widely used in the petroleum industry, allow determination of many technical parameters relative to prospecting, study or development of a reservoir such as a hydrocarbon reservoir for example. In fact, a reservoir model is representative of the structure of the reservoir and of the behavior thereof. It is thus, for example, possible to determine which zones are the likeliest to contain hydrocarbons, the zones in which it can be interesting/necessary to drill an injection well in order to enhance hydrocarbon recovery, the type of tools to use, the properties of the fluids used and recovered, etc. These interpretations of reservoir models in terms of "technical development parameters" are well known, even though new methods are regularly developed. It is thus crucial, in the petroleum industry, to construct a reservoir model as precisely as possible. Integration of all the available data is therefore essential.

The purpose of a reservoir model thus is to best account for all the information relative to a reservoir. A reservoir model is representative when a reservoir simulation provides historical data estimations that are very close to the observed data. What is referred to as historical data are the production data obtained from measurements in wells in response to the reservoir production (oil production, water production of one or more wells, gas/oil ratio (GOR), production water proportion (water cut)), and/or repetitive seismic data (4D seismic impedances in one or more regions, etc.). A reservoir simulation is a technique allowing simulation of fluid flows within a reservoir by software referred to as "flow simulator."

History matching modifies the parameters of a reservoir model, such as permeabilities, porosities or well skins (representing damages around the well), fault connections, etc., in order to minimize the differences between the simulated and measured historical data. The parameters can be linked with geographic regions, such as permeabilities or porosities around one or more wells.

Assisted history matching techniques are widely used to characterize a reservoir by integrating well data and seismic data. The techniques described in the following documents are for example known:

Roggero, F. and Hu, L. Y.: "Gradual Deformation of Continuous Geostatistical Models for History Matching", Paper SPE 49004, Proc. SPE Annual Technical Conference and Exhibition, New Orleans, USA, 1998;

Gosselin, O., Cominelli, A. van den Berg, S. and Chowdhury, S. D.: "A Gradient-Based Approach for History Matching of Both Production and 4D Seismic Data", Proceeding 7th European Conference on the Math. of Oil Recovery, Baveno, Italy, 2000;

Cheng, H., Wen, X., Milliken, W. J. and Datta-Gupta, A.: "Field Experiences with Assisted and Automated History Matching", Paper SPE 89857, SPE ATC&E, Houston, Tex., USA, 2004;

Roggero, F., Ding, D. Y., Berthet, P., Lerat, O., Cap, J. and Schreiber, P. E.: "Matching of Production History and 4D Seismic Data—Application to the Girassol Field, Offshore Angola", Paper SPE 109929, SPE ATC&E, Anaheim, Calif., USA, 2007.

During history matching, an objective function that measures the differences between the observed historical data and the simulated historical data is first defined. The larger the number of parameters of the reservoir model, the more difficult the matching procedure is because more simulations are required to evaluate the objective function in order to find a better result.

Various optimization techniques have been developed to minimize the objective function. Approaches based on the gradient method (Gosselin, O., Cominelli, A. van den Berg, S. and Chowdhury, S. D.: "A Gradient-Based Approach for History Matching of Both Production and 4D Seismic Data", Proceeding 7th European Conference on the Math. of Oil Recovery, Baveno, Italy, 2000) are widely used in history matching. Other approaches such as stochastic optimizations (Mohamed, L., Christie, M. and Demyanov, V.: "Comparison of Stochastic Sampling Algorithms for Uncertainty Quantification", Paper SPE119139 presented at SPE Reservoir Simulation Symposium, Houston, Feb. 2-4, 2009) or adaptive training algorithms (Feraille, M. and Roggero, F.: "Uncertainty Quantification for Mature Field Combining the Bayesian Inversion Formalism and Experimental Design Approach", 9th European Conf. on Math. of Oil Recovery, Cannes, France, 30 Aug.-2 Sep. 2004) are sometimes also used. In all these approaches, the optimization methods are directly applied to the objective function containing all of the reservoir data.

Assisted history matching techniques are thus developed to help reservoir engineers improve the matching efficiency. This history matching is however generally a long and fastidious process which also requires great effort and expertise from reservoir engineers. These methods require many reservoir simulations in order to evaluate the objective function since the number of parameters is large. These techniques are therefore very costly in CPU time and they are not always directly suited to the needs of specialists in charge of the petroleum reservoir development. It is thus important to reduce the number of simulations in the optimization process.

In order to reduce the number of simulations, Maschio, C. and Schiozer, D. J.: "A New Methodology for Assisted History Matching Using Independent Objective Functions" Petroleum Science and Technology, v 26, n 9, p 1047-1062, June 2008, propose using independent objective functions. In this approach, the global objective function is decomposed into several totally independent objective functions and it is assumed that a parameter that influences an independent objective function must have no impact on other independent objective functions. In practice, it is very difficult to find cases verifying this hypothesis. Furthermore, this method minimizes the independent objective functions, without considering minimization of the global objective function.

SUMMARY OF THE INVENTION

The invention is a method of developing a petroleum reservoir from a reservoir model, wherein history matching is performed where the number of reservoir simulations is reduced. The method uses an approach of optimization of local objective functions defined by regions, while considering the global coherence of the problem by minimizing the global objective function over all the reservoir data. Reduction in the number of reservoir simulations is obtained, on the one hand, through a reduction in the number of parameters for the local objective functions, via a selection of regions for decomposition and on the other hand, by planning the parameter perturbations to be carried out to minimize the global objective function.

The invention relates to a method (or process) of developing a petroleum reservoir from a reservoir model having a set of grid cells to which values of at least M parameters obtained from measurements within the petroleum reservoir are assigned. The method comprises the following:

defining, according to the M parameters, a global objective function measuring differences between measured historical data values and simulated historical data values by the reservoir model;

decomposing the global objective function into a sum of k local objective functions with each local objective function measuring the differences over a geographic region of the reservoir, defining each local objective function from $m_k$ parameters having an impact on the historical data corresponding to each region, the $m_k$ parameters being selected from among the M parameters, and each region being determined to minimize the number $m_k$ of parameters, modifying parameter values by minimizing the global objective function by a gradient method wherein derivatives of the local objective functions with respect to parameters $m_k$ are estimated by a parameter perturbation technique based on a perturbation matrix having a rank equal to number $m_k$ of parameters of the local objective function; and using the modified model to develop the reservoir.

According to the invention, the $m_k$ parameters can be selected by a sensitivity analysis for each local objective function, and the perturbations can be performed with different values for a single parameter.

The historical data are preferably production data obtained from measurements in wells in response to a reservoir production, and/or repetitive seismic data. The production data can be selected from among the following data: oil production, gas production, well water production, gas/oil ratio (GOR), water cut, pressure, temperature, hydrocarbons composition. The M parameters can be selected from among the following parameters: petrophysical properties such as permeability, porosity, relative permeabilities and capillary pressures, petro-elastic properties, spatial distribution of facies, damage around the well, well connectivity index, fault connections or throws and structural parameters.

According to the invention, the coefficients of the perturbation matrix can be determined by carrying out the following:

i. Reducing the number of coefficients to be generated by applying an identical coefficient for a given perturbation to all the parameters involved in a single local objective function;

ii. Generating randomly the perturbation matrix coefficients while respecting i; and iii. Modifying the coefficients to minimize an error on the estimation of the derivatives of the local objective functions with respect to parameters $m_k$.

The following formula can be used to calculate error $\epsilon_{tot}$:

$$\varepsilon_{tot} = \sum_{k=1}^{N_{reg}} \sum_{j=1}^{m_k} (D_j H_{mk} - 2m_k)^2$$

with:

$N_{reg}$ being a number of local objective functions $D_j H_{mk}$ being a numerical derivative of $H_{mk}$ with respect to a parameter $\lambda_{k,j}$ $$-H_{mk}(\lambda_{k,1}, \lambda_{k,2}, \ldots, \lambda_{k,m_k}) = \sum_{j=1}^{m_k} \sum_{i=1}^{m_k} \lambda_{k,i} \lambda_{k,j}.$$

The history matching method (or process) according to the invention thus allows reduction of the CPU time required for matching historical data and therefore to significantly decrease the time spent for reservoir surveys, thus allowing meeting the expectations of reservoir engineers in charge of the development of a petroleum reservoir. This approach is general because the interferences between the local objective functions and the parameters can be taken into account since a parameter can have an impact on several local objective functions.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

Figure 1:
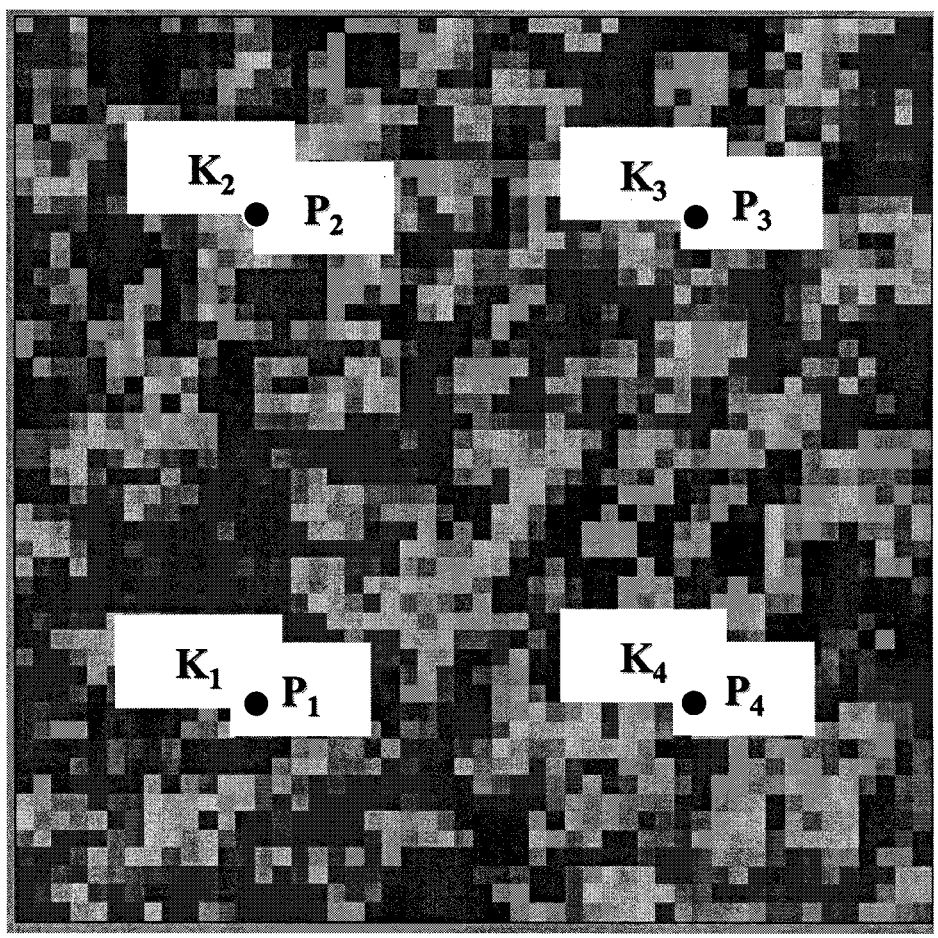
FIG. 1 shows a heterogeneous reservoir with 4 production wells $P_1$, $P_2$, $P_3$ and $P_4$. Parameters $K_1$, $K_2$, $K_3$ and $K_4$ represent the permeabilities (or permeability multipliers) around these 4 wells.

The method (or process) according to the invention allows development of a petroleum reservoir from optimized history matching of a reservoir model. History matching is optimized in that it allows significant reduction in the number of reservoir simulations, which are very costly in CPU time, and the time spent for a reservoir survey.

In the present invention, decomposing is performed by matching regions. This decomposition represents a partitioning of the data to be matched. The regions are defined in such a way that only part of the parameters have a significant impact on the historical data corresponding to each region. With this procedure, matching can be carried out in a relatively independent manner in each region, while obtaining a global improvement. Since the number of influential parameters is reduced by region, it is thus possible to greatly limit the number of simulations required for matching. In order to provide matching coherence over the entire reservoir, a parameter perturbation technique taking account of the interferences between the regions is associated therewith. The method mainly comprises four stages:
1. Generating an initial reservoir model and selecting the parameters to be modified to improve the model;
2. Defining a global objective function for history matching and decomposing the objective function into local components by region, based on data partitioning;
3. Planning in an optimum manner the simulations to be carried out by perturbing the parameter values so as to calculate the gradients of the objective function; and
4. Constructing a new reservoir model by modifying the parameters to minimize the objective function by an optimization procedure based on the gradient method.

1—Generating an Initial Reservoir Model

The method is started by generating an initial reservoir model that takes into account various aspects such as the geological structure, the petrophysical properties, the fluid properties, the wells, etc.

A reservoir model is a set of grid cells to which values of at least M parameters obtained from measurements in the petroleum reservoir are assigned. The parameters that are used to describe the structure, the petrophysics, etc., are estimated using static data. Some parameters have great uncertainties and can be far from reality. However, dynamic data such as production or 4D seismic data can be used to reduce the uncertainties and improve the characterization of these parameters via the history matching procedure. In this stage, all the potential parameters to be modified are selected to improve the reservoir model. Generation of an initial reservoir model is well known.

2—Defining and Decomposing a Global Objective Function

The global objective function that measures differences between measured historical data values and simulated historical data values by the reservoir model is generally given by the following formula:

$$F(\lambda) = \frac{1}{2}\sum_{i=1}^{Nwell} \omega_{p,i} \frac{1}{N_{time}(i)} \sum_{n=1}^{N_{time}(i)} \left(\frac{P_{i,n}^{obs} - P_{i,n}^{sim}(\lambda)}{\sigma_p(i)}\right)^2 + \frac{1}{2}\sum_{j=1}^{Nzone} \omega_{s,j} \frac{1}{N_{time}(j)} \sum_{n=1}^{N_{time}(j)} \left(\frac{S_{j,n}^{obs} - S_{j,n}^{sim}(\lambda)}{\sigma_s(j)}\right)^2$$

where:
$N_{well}$ is the number of wells;
$N_{zone}$ is the number of 4D seismic zones;
$P^{obs}$ is all the production data observed;
$P^{sim}$ is all the production data simulated with the model;
$S^{obs}$ represents the 4D seismic data observed;
$S^{sim}$ represents the 4D seismic data simulated with the model;
$\omega_p$ are the weights associated with the production data;
$\omega_s$ are the weights associated with the 4D seismic data;
$\sigma_p(i)$ is the confidence interval for the production data in well i;
$\sigma_s(j)$ is the confidence interval for the seismic data in zone j;
$N_{time}$ represents the number of points in time for performing the measurements; and
$\lambda=(\lambda_1, \lambda_2, \ldots, \lambda_M)$ are the M parameters to be optimized.

The production data can be selected from among the following data: oil production, gas production, well water production, gas/oil ratio (GOR), production water proportion, pressure, temperature, hydrocarbon composition. This list is of course not exhaustive.

The parameters can be selected from among the following parameters: petrophysical properties such as permeability, porosity, relative permeabilities and capillary pressures, petro-elastic properties, spatial facies distribution, damage around the well, well connectivity index, fault connection or throw and structural parameters. This list is of course not exhaustive.

This global objective function can be directly decomposed on the partitioning of the data by region as follows:

$$F(\lambda_1, \ldots, \lambda_M) = \sum_{k=1}^{N_{reg}} F_k(\lambda_1, \ldots, \lambda_M)$$

where $F_k(\lambda_1, \ldots, \lambda_M)$ is a component (local objective function) that estimates the differences between the observed data and the simulated data concerning the 4D seismic wells and zones in region k ($k=1, \ldots, N_{reg}$), and $N_{reg}$ is the number of regions. It can be noted that the local objective function theoretically always depends on M parameters, but the sensitivities of these parameters on each local objective function can be very different. This can thus be reduced, by a sensitivity analysis for example, the number of main (significant) parameters for the local objective functions.

Thus, by suitably partitioning the components of the objective function, that is, by suitably defining the regions and the parameters by regions, the number of main parameters for the local objective functions can be reduced to a minimum.

It should be noted that the objective function partitioning principle, illustrated above with a "least squares" type objective function, can be generalized to other formulation types.

This method can be illustrated with an example of a heterogeneous reservoir comprising 4 production wells (FIG. 1). A high uncertainty on the permeabilities is assumed in this case. The productions of the 4 wells $P_1$, $P_2$, $P_3$ and $P_4$ depend of course on the permeability values of the field. It is desired to modify the values of the permeabilities (or of the permeability multipliers) $K_1$, $K_2$, $K_3$ and $K_4$ around these 4 wells by minimizing the objective function to improve the model. In this example, the objective function can be decomposed by well as follows:

$$F(K_1, K_2, K_3, K_4) = \sum_{k=1}^{4} F_k(K_1, K_2, K_3, K_4)$$

where $F_k(K_1, K_2, K_3, K_4)$ corresponds to the differences between observed and simulated production data for well $P_k$ (K=1, 2, 3, 4). The production of well $P_1$ mainly depends on the value of parameter $K_1$, and the impacts of the other parameters ($K_2$, $K_3$ and $K_4$) on the production of $P_1$ are very low. The dependence of the parameters on local objective function $F_1$ can be approximated by:

$F_1(K_1,K_2,K_3,K_4) \approx F_1(K_1)$

Similarly:

$F_2(K_1,K_2,K_3,K_4) \approx F_2(K_2)$ $F_3(K_1,K_2,K_3,K_4) \approx F_3(K_3)$ $F_4(K_1,K_2,K_3,K_4) \approx F_4(K_4)$ In more complex cases, parameter dependences can be determined by a sensitivity analysis. This technique is known with, an example being described in the following document:
A. Saltelli, S. Tarantola, F. Campolongo. Sensitivity Analysis in Practice: A Guide to Assessing Scientific Models. Wiley, 2004.

Thus, decomposition of the global objective function according to the invention results in each component (local objective function) depending on the smallest possible number of parameters:

$F_k(\lambda_1,\lambda_2,\ldots,\lambda_M) \approx F_k(\lambda_{k,1},\lambda_{k,2},\ldots,\lambda_{k,m_k})$ with $m_k$ the smallest possible ($k=1, \ldots, N_{reg}$). Let $M_m = \max(m_1, \ldots, m_M)$, the maximum value among $m_1, \ldots, m_{N_{reg}}$, the goal of this stage is to seek a decomposition of the objective function such that $M_m$ is as small a possible with $M_m < M$.

Thus, during this stage, the global objective function is decomposed into a sum of k local objective functions defined as a function of $m_k$ parameters selected from among the M parameters. Each local objective function measures the simulation differences in a given geographic region. These regions are selected by minimizing the number $m_k$ of parameters having an influence on the historical data.

3—Perturbation Planning and Derivative Calculation

According to the invention, the optimization procedure for modifying parameter values is based on the calculation of gradients (partial derivatives). The derivatives $$D_i F = \frac{\partial F}{\partial \lambda_i}$$

of objective function $F(\lambda_1, \ldots, \lambda_i, \ldots, \lambda_M)$ with respect to parameters $\lambda_i$ ($i=1, \ldots, M$) are calculated by a parameter perturbation technique wherein M+1 values of the objective function are evaluated. For example, derivative $$D_i F = \frac{\partial F}{\partial \lambda_i}$$

can be calculated by:

$$D_i F = (\lambda_1, \ldots, \lambda_i, \ldots, \lambda_M) \approx$$
$$\frac{F(\lambda_1, \ldots, \lambda_i + \Delta\lambda_i, \ldots, \lambda_M) - F(\lambda_1, \ldots, \lambda_i, \ldots, \lambda_M)}{\Delta\lambda_i}$$
$$(i = 1, \ldots, M)$$

To know all the M derivatives, objective function F has to be evaluated on the initial point ($\lambda_1 \ldots, \lambda_M$) and for M perturbed points ($\lambda_1, \ldots, \lambda_i + \Delta\lambda_i, \ldots, \lambda_M$) for $I=1, \ldots, M$. That is M+1 reservoir simulations have to be carried out. Now, reservoir simulation is very costly in CPU time.

Similarly, for a local objective function $F_k$ ($k=1, \ldots, N_{reg}$), $m_k$ perturbations are needed (or $m_k+1$ simulations) to calculate its derivatives. If $M_m < M$, that is $m_k < M$ for all the local objective functions ($k=1, \ldots, N_{reg}$), derivatives can be calculated of the (global) objective function with less simulations ($M_m+1$ simulations) than the conventional approach (M+1 simulations) using an optimum planning.

According to the objective function decomposition formula, the derivative of the global objective function can be calculated by the sum of the derivatives of the local objective functions:

$$D_i F(\lambda_1, \ldots, \lambda_M) = \sum_{k=1}^{N_{reg}} D_i F_k(\lambda_1, \ldots, \lambda_M) \approx \sum_{k=1}^{N_{reg}} D_i F_k(\lambda_{k,1}, \ldots, \lambda_{k,m_k})$$

Planning the perturbations, for a given local objective function, defines the variations to be applied to the various parameters of the local objective function so as to be able to calculate its derivatives with respect to all its parameters.

To achieve this planning, a matrix referred to as perturbation matrix is constructed. This matrix contains as many columns as there are parameters used to define the global objective function, and as many rows as there are perturbations to achieve. Each block of the matrix comprises the parameter variation to be performed. This variation is also referred to as a "perturbation step" and it is denoted by $a_{ij}$. Thus, in Table 1, which corresponds to a perturbation matrix, $a_{ij}$ corresponds to the variation of parameter $\lambda_j$ for perturbation i, L being the number of perturbations.

TABLE 1A

Perturbation planning

| Perturbation | $\lambda_1$ | $\lambda_2$ | $\lambda_3$ | $\lambda_4$ | ... | $\lambda_M$ |
|---|---|---|---|---|---|---|
| 1 | $a_{11}$ | $a_{12}$ | $a_{13}$ | $A_{14}$ | | $a_{1M}$ |
| 2 | $a_{21}$ | $a_{22}$ | $a_{23}$ | $A_{24}$ | | $a_{2M}$ |
| 3 | $a_{31}$ | $a_{32}$ | $a_{33}$ | $A_{34}$ | | $a_{3M}$ |
| ... | | | | | | |
| L | $a_{L1}$ | $a_{L2}$ | $a_{L3}$ | $a_{L4}$ | | $a_{LM}$ |

A conventional planning corresponds to L=M, $a_{ij}$=0 (if i≠j) and $a_{ii}=\Delta\lambda_i$ (i=1, ..., L; j=1, ..., M):

TABLE 1B

Conventional perturbation planning

| Perturbation | $\lambda_1$ | $\lambda_2$ | $\lambda_3$ | $\lambda_4$ | ... | $\lambda_M$ |
|---|---|---|---|---|---|---|
| 1 | $\Delta\lambda_1$ | 0 | 0 | 0 | | 0 |
| 2 | 0 | $\Delta\lambda_2$ | 0 | 0 | | 0 |
| 3 | 0 | 0 | $\Delta\lambda_3$ | 0 | | 0 |
| ... | | | | | | |
| L (=M) | 0 | 0 | 0 | 0 | | $\Delta\lambda_M$ |

A conventional case thus requires L (L=M) perturbations in order to apply a variation independently to each parameter and therefore to be able to calculate the M derivatives of the local objective function.

Perturbation Planning

According to the invention, a perturbation planning technique is applied, wherein a variation is applied to several parameters simultaneously, so as to minimize the number of perturbations (number of rows of the perturbation matrix) while allowing calculation of the M derivatives of the local objective function.

The minimum number of perturbations and the perturbation steps $a_{ij}$ required for calculation of the derivatives of a local objective function are therefore studied. An example is taken where local objective function $F_1$ has 3 main parameters. Without loss of generality, it is assumed that the 3 main parameters of local objective function $F_1$ are $\lambda_1$, $\lambda_2$ and $\lambda_3$. Let $(\lambda_1^0, \lambda_2^0, \lambda_3^0)$ be the initial point, using Taylor's development with the local objective function $F_1$ corresponding to perturbation i being expressed as follows:

$$F_1(\lambda_1^0 + a_{i1}, \lambda_2^0 + a_{i2}, \lambda_3^0 + a_{i3}) \approx F_1(\lambda_1^0, \lambda_2^0, \lambda_3^0) + \sum_{j=1}^{3} D_j F_1(\lambda_1^0, \lambda_2^0, \lambda_3^0) a_{ij}$$

$(i = 1, \ldots, L)$

In the above system, $D_j F_i$ (j=1, 2, 3) are unknown and all the other terms are known using the reservoir simulations on the initial point $(\lambda_1^0, \lambda_2^0, \lambda_3^0)$ and the perturbed points $(\lambda_1^0 + a_{i1}, \lambda_2^0 + a_{i2}, \lambda_1^0 + a_{i3})$ (j=1, ..., L). To calculate derivatives $D_j F_1$ (j=1, 2, 3), the following system of equations is considered:

$$\sum_{j=1}^{3} a_{ij} D_j F_1 = F_1(\lambda_1^0 + a_{i1}, \lambda_2^0 + a_{i2}, \lambda_3^0 + a_{i3}) - F_1(\lambda_1^0, \lambda_2^0, \lambda_3^0)$$

$(i = 1, \ldots, L)$

There is an infinity of solutions if the number of perturbations is less than the number of parameters that is set to 3 in this example. Three perturbations are thus required at the minimum, and coefficients $a_{ij}$ of the perturbations must verify that the rank of the matrix $$C = \begin{pmatrix} a_{11} & a_{12} & a_{13} \\ a_{21} & a_{22} & a_{23} \\ \vdots & \vdots & \vdots \\ a_{L1} & a_{L2} & a_{L3} \end{pmatrix}$$

is 3. This matrix is referred to as perturbation matrix of local objective function $F_1$.

Various perturbation steps $a_{ij}$ for the same parameter in different perturbations i (i=1, ..., L) can be used so that the rank of C is equal to the number of parameters $m_k$.

It is important to minimize the number of perturbations L. For each local objective function, it is possible to use only $m_k$ perturbations to calculate its derivatives. The goal of this stage is to arrange the perturbation coefficients so as to minimize the number of perturbations L. In particular, it is desired to have L=$M_m$.

Derivatives Calculation

In order to calculate derivatives $D_j F_1$ (j=1, 2, 3) in the previous example, the following minimization problem is solved:

Find ($x_1$, $x_2$, $x_3$) such that function with $$G(x_1, x_2, x_3) = \sum_{i=1}^{L} \left( \sum_{j=1}^{3} a_{ij} x_j - b_i \right)^2$$

with $b_i = F_1(\lambda_1^0 + a_{i1}, \lambda_2^0 + a_{i2}, \lambda_3^0 + a_{i3}) - F_1(\lambda_1^0, \lambda_2^0, \lambda_3^0)$ (i=1, 2, 3) reaches the minimum.

$x_1, x_2, x_3$ correspond to the derivatives $D_j F_1$ (j=1, 2, 3) to be calculated.

Generally, in order to determine the derivatives of local objective function $F_k$ that depends on $m_k$ main parameters, at least $m_k$ perturbations are necessary and the rank of the perturbation matrix of $F_k$ is $m_k$. Let C be the perturbation matrix of objective function $F_k$, C is a matrix with L rows and $m_k$ columns with L≥$m_k$. The rank of C has to be $m_k$, and the derivatives of local objective function $F_k$ can be calculated by solving the following minimization problem:

It is desired to find ($x_1, \ldots, x_{m_k}$) such that function $$G(x_1, \ldots, x_{m_k}) = \sum_{i=1}^{L} \left( \sum_{j=1}^{m_k} c_{ij} x_j - b_i \right)^2$$

is minimal, where $c_{ij}$ (i=1, ..., L; j=1, ..., $m_k$) are the coefficients of the perturbation matrix C, $b_i = F_k(P_i) - F_k(P_0)$ (i=1, ..., L) with $P_0$ being the initial point and $P_i$ being the point corresponding to perturbation i.

Thus, the derivatives of the local objective functions with respect to parameters $m_k$ are estimated by a parameter perturbation technique wherein R values of the local objective function are evaluated. The value of R is decreased by constructing for each objective function a perturbation matrix having a rank equal to the number of parameters $m_k$ of the local objective function.

In the example of the heterogeneous reservoir with 4 wells, one perturbation with 2 simulations being used instead of 4 perturbations with 5 simulations being used to calculate all the derivatives.

According to an embodiment, the coefficients of the perturbation matrix (Table 1a) can be determined by applying the following method:
i. Reducing the number of coefficients to be generated;
ii. Generating the coefficients of a first perturbation matrix;
iii. Estimating an error on the derivative calculative of this matrix; and
iv. Generating at least one other perturbation matrix minimizing this error.

i. Reducing the Number of Coefficients to be Generated

Perturbation matrix A is used to calculate the derivatives. The larger the size of the perturbation matrix, the higher the probability of having erroneous derivative calculations for certain local objective functions. In order to better control the coefficients, it is proposed to use a "graph coloring" technique that can reduce the number of coefficients to be generated. This technique thus allows reduction of the probability of erroneous derivative calculations in the local objective functions.

According to the graph coloring technique, a graph is described by vertices and edges. Two vertices are considered to be neighboring if there is an edge that connects these two vertices. The graph coloring method colors the vertices with a minimum amount of colors so that the color of a vertex is always different in relation to its neighbors. An application of the graph coloring method in the optimization compresses the hollow matrices to evaluate the non-zero elements. The following document describes this technique:

Shahadat Hossain and Trond Steihaug, "*Computing a Sparse Jacobian Matrix by Rows and Columns*", Optimization Methods and Software, vol. 10, pp 33-48, 1998.

Within the scope of the invention, the graph coloring method is used to reduce the number of coefficients of the perturbation matrix. In the graph, each parameter is considered as a vertex. If two parameters are involved as main parameters in the same local objective function, they are considered to be neighbors and there is an edge that connects these two parameters (vertices). A graph coloring method can color this parameter graph.

If two parameters have the same color, the coefficients are identical for these two parameters in the same perturbation (the same row of the perturbation matrix). In other words, the columns are identical for the parameters having the same color in the perturbation matrix. For example, if parameters $x_1$, $x_3$ and $x_8$ have the same color, then $a_{i1} = a_{i3} = a_{i8}$ for i=1, ..., L in the planning matrix, which reduces the number of coefficients to be generated.

Let $M_c$ be the number of colors for the parameters, $M_c \leq M$. A colored matrix $\tilde{A}$ of L=$M_m$, rows and $M_c$ columns is generated. By definition of $M_m$, it is known that there is at least one local component having $M_m$ parameters. Thus $M_c \geq M_m$ since there is always a parameter having at least $M_c - 1$ neighbors. Colored matrix $\tilde{A}$ is thus generated by:

$$\tilde{A} = \begin{pmatrix} 1 & 0 & \cdots & 0 & \tilde{a}_{11} & \cdots & \tilde{a}_{1(M_c - M_m)} \\ 0 & 1 & \cdots & 0 & \tilde{a}_{21} & \cdots & \tilde{a}_{2(M_c - M_m)} \\ \vdots & \vdots & \ddots & \vdots & \vdots & \ddots & \vdots \\ 0 & 0 & \cdots & 1 & \tilde{a}_{M_m 1} & \cdots & \tilde{a}_{M_m(M_c - M_m)} \end{pmatrix}$$

where $\tilde{A}$ is an identity matrix and of an arbitrary matrix of $M_m$ rows and $M_c - M_m$ columns. The number of coefficients to be generated is reduced from $M_m \times M$ to $M_m(M_c - M_m)$. Once $\tilde{A}$ is generated, its columns are used to fill perturbation matrix A.

ii. Generating the Coefficients of a First Perturbation Matrix

According to an embodiment, the coefficients of the perturbation matrix are randomly selected.

iii. Estimating an Error on the Derivative Calculation of this Matrix

Errors in the calculation of derivatives are directly linked with perturbation matrix A. In order to evaluate the potential errors in the derivative calculation, a test function is used. For example, a second-order polynomial of the type can be used as follows:

$$H_m(x_1, \ldots, x_m) = \sum_{j=1}^{m} \sum_{i=1}^{m} x_i x_j.$$

For each local objective function $F_k$, the derivatives of $$H_{mk}(\lambda_{k,1}, \lambda_{k,2}, \ldots, \lambda_{k,m_k}) = \sum_{j=1}^{m_k} \sum_{i=1}^{m_k} \lambda_{k,i} \lambda_{k,j}$$

instead of $F_k(\lambda_{k,1}, \lambda_{k,2}, \ldots, \lambda_{k,m_k})$ are calculated using perturbation matrix A. The analytical derivatives of test function $H_{mk}$ are known. At point $\lambda_{k,1} = \lambda_{k,2} = \ldots = \lambda_{k,m_k} = 1$, all the derivatives are equal to $2m_k$. Thus the error on the numerical derivatives for component $F_k$ is estimated by the following formula:

$$\varepsilon_k = \sum_{j=1}^{m_k} (D_j H_{mk} - 2m_k)^2$$

where $D_j H_{mk}$ is the numerical derivative of $H_{mk}$ with respect to parameter $\lambda_{k,j}$ (j=1, ..., $m_k$) calculated with perturbation matrix A at point $\lambda_{k,1} = \lambda_{k,2} = \ldots = \lambda_{k,m_k} = 1$. The total error of perturbation matrix A is estimated by:

$$\varepsilon_{tot} = \sum_{k=1}^{N_{reg}} \varepsilon_k$$

since there are $N_{reg}$ local objective functions. The best perturbation matrix is the matrix with the smallest error.

IV. Generating at Least One Other Perturbation Matrix Minimizing this Error

According to an embodiment, several perturbation matrices, that is several sets of coefficients, are generated by an optimization for minimizing the perturbation matrix error.

In particular, it is possible to generate several perturbation matrices and to select the matrix with the smallest error.

4—Constructing the New Model by Optimization

The initial reservoir model is thus updated by modifying the parameters of this model with the new parameters being those minimizing the global objective function. Several optimization methods based on gradient calculation are available (see D. Sinoquet and F. Delbos: "Adapted Nonlinear Optimization Method for Production Data and 4D Seismic Inversion", Proceeding of European Conference on Mathematics of Oil Recovery, Bergen, Norway, 8-11 Sep. 2008) for history matching.

An optimization method can be implemented using the objective function decomposition and the perturbation planning described in the previous stages to minimize the (global) objective function by modifying the parameters. Thus a new reservoir model can be obtained with the optimum parameters that minimize the objective function.

The model which is matched with the historical data allows the development of the petroleum reservoir to be optimized. This model allows determination of more precisely and more rapidly many technical parameters relative to prospecting, study or development of a reservoir and, for example, a hydrocarbon reservoir. It is thus, for example, possible to determine which zones are the likeliest to contain hydrocarbons, the zones in which it can be interesting/necessary to drill an injection well in order to enhance hydrocarbon recovery, the type of tools to use, the properties of the fluids used and recovered, etc.

Application Example

Figure 2:
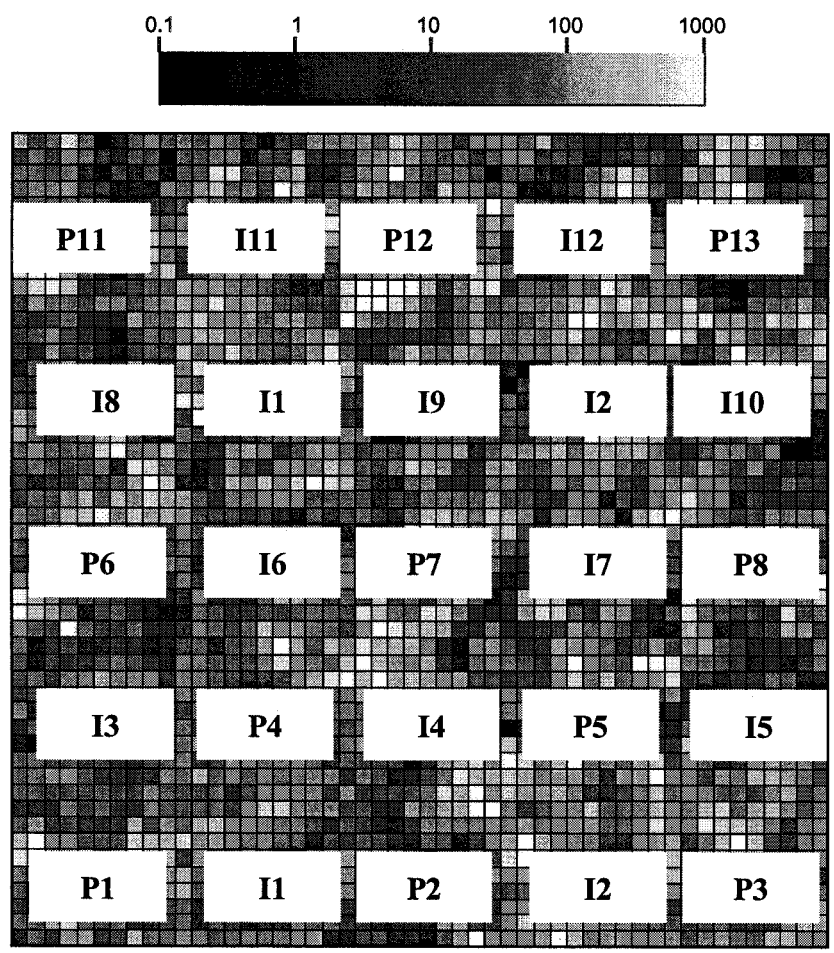
FIG. 2 shows the heterogeneous reservoir with 25 wells, among which are 12 injection wells (I1 to I12) and 13 production wells (P1 to P13) in the example. This reservoir is gridded with 50 cells in direction x and 50 cells in direction y.

Let there be a heterogeneous reservoir of 2500 m in size in direction x, 2500 m in direction y and 10 m in direction z. This reservoir is gridded with 50 cells in direction x and 50 cells in direction y, and its permeabilities (K) are given in FIG. 2. Twenty-five wells are drilled in this reservoir, among which are twelve injection wells and thirteen production wells. The initial pressure of the reservoir is 250 bars. The wells work at imposed pressures with 320 bars at the injection wells and 180 bars at the production wells. The skins (damage or permeability improvement around the well) are zero for all the wells. A 4000-day production history is available. The production data measured are: the oil flow rates of the 13 production wells, the water flow rate of the 12 injection wells and the water cuts of the 13 production wells.

The global objective function that measures the differences between the simulated historical data and the measured historical data is defined as follows:

$$F(\lambda) = \frac{1}{2}\left(\sum_{i=1}^{N_{prod}} \frac{1}{N_{time}} \sum_{n=1}^{N_{time}} \left(\frac{Q_{o,i,n}^{obs} - Q_{o,i,n}^{sim}(\lambda)}{\sigma_o(i)}\right)^2 + \right.$$

$$\sum_{i=1}^{N_{prod}} \frac{1}{N_{time}} \sum_{n=1}^{N_{time}} \left(\frac{FW_{i,n}^{obs} - FW_{i,n}^{sim}(\lambda)}{\sigma_{fw}(i)}\right)^2 +$$

$$\left.\sum_{i=1}^{N_{inj}} \frac{1}{N_{time}} \sum_{n=1}^{N_{time}} \left(\frac{Q_{w,i,n}^{obs} - Q_{w,i,n}^{sim}(\lambda)}{\sigma_w(i)}\right)^2\right)$$

where:
$N_{prod}=13$ is the number of production wells;
$N_{inj}=12$ is the number of injection wells;
$N_{time}=40$ is the number of points measured every 100 days;
$Q_o$ is the oil flow rate of the production wells;
$Q_w$ is the water flow rate of the injection wells; and
FW is the water cut;
$\sigma_o$, $\sigma_{fw}$ and $\sigma_w$, which are the confidence intervals for the oil flow rate, the water cut and the water flow rate, are calculated as a function of the mean and of the variance of the data for each well in this example,
$\lambda=\lambda_{p1}, \ldots, \lambda_{p13}, \lambda_{I1}, \ldots, \lambda_{I12})$ correspond to the skin values of the wells, the first values $\lambda_{p1}, \ldots, \lambda_{p13}$ being related to the thirteen production wells and $\lambda_{I1}, \ldots, \lambda_{I12}$ to the twelve injection wells.

This global objective function is decomposed into twenty-five local objective functions linked with the production and injection wells:

$$F(\lambda_{P1}, \ldots, \lambda_{P13}, \lambda_{I1}, \ldots, \lambda_{I12}) = \sum_{k=1}^{25} F_k(\lambda_{P1}, \ldots, \lambda_{P13}, \lambda_{I1}, \ldots, \lambda_{I12})$$

with:

$$F_k(\lambda_{P1}, \ldots, \lambda_{P13}, \lambda_{I1}, \ldots, \lambda_{I12}) =$$

$$\frac{1}{2}\frac{1}{N_{time}}\sum_{n=1}^{N_{time}}\left(\left(\frac{Q_{o,k,n}^{obs} - Q_{o,k,n}^{sim}}{\sigma_o(i)}\right)^2 + \left(\frac{FW_{k,n}^{obs} - FW_{k,n}^{sim}}{\sigma_{fw}(i)}\right)^2\right)$$

(k=1, ..., 13) corresponding to the 13 production wells, and $$F_k(\lambda_{P1}, \ldots, \lambda_{P13}, \lambda_{I1}, \ldots, \lambda_{I12}) = \frac{1}{2}\frac{1}{N_{time}}\sum_{n=1}^{N_{time}}\left(\frac{Q_{w,k-13,n}^{obs} - Q_{w,k-13,n}^{sim}}{\sigma_w(i)}\right)^2$$

(k=14, ..., 25) corresponding to the 12 injection wells.

In the construction of the initial reservoir model, the real skin values are not known. The initial skin values estimated at 10 for all the wells are adopted. It is assumed that the possible skin values range between 0 and 20.

Figure 3:
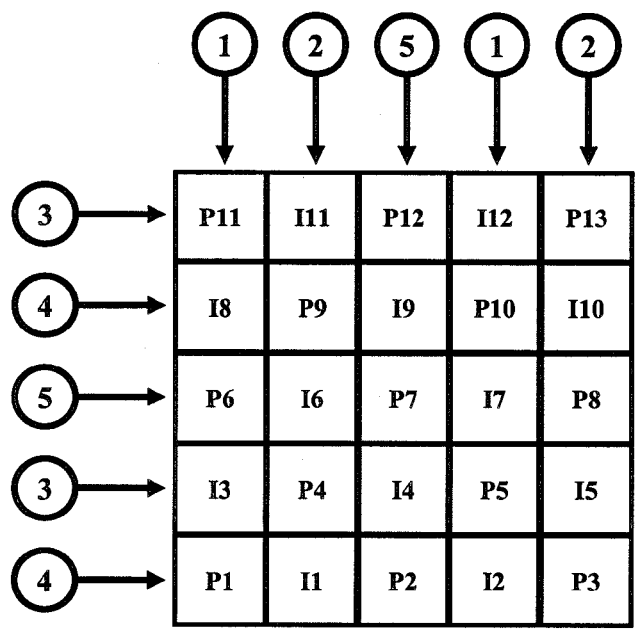
FIG. 3 shows the perturbation diagram. The numbers in the circles correspond to the perturbation numbers.

The location of the wells in this reservoir (FIG. 2) shows that the skin of an injection well has a strong impact only on the well itself and on the surrounding production wells (maximum 4 production wells), and its impact on the other wells has to be relatively weak. Similarly, the skin of a production well has a strong impact only on the well itself and on the surrounding injection wells, and little impact on the other wells. Therefore, for each local objective function, there are 5 main parameters at the maximum (the skin on the well considered in the local objective function and the skins on the neighboring wells). The perturbations to be applied to the parameters, which guarantee the rank of the perturbation matrix of each local objective function equal to the number of main parameters of this local objective function, can be planned as follows (FIG. 3):

Perturbation 1: perturbing the wells in columns 1 and 4
Perturbation 2: perturbing the wells in columns 2 and 5
Perturbation 3: perturbing the wells in rows 1 and 4
Perturbation 4: perturbing the wells in rows 2 and 5
Perturbation 5: perturbing the wells in row 3 and column 3.

These perturbations are summed up in Table 2. The cells with a cross correspond to the perturbations with non-zero coefficients. The unfilled cells mean that there is no perturbation for the corresponding parameters, which is translated into zero coefficients for these cells.

The method described in paragraph 3 (stages i, ii and iii) can be applied to generate the coefficients of the perturbation matrix: 20 perturbation matrices are first randomly generated according to stage 3.i. The errors are then calculated for these 50 perturbation matrices according to stage 3.ii. The matrix with the smallest error is then selected to optimize the objective function of the example.

Figure 12:
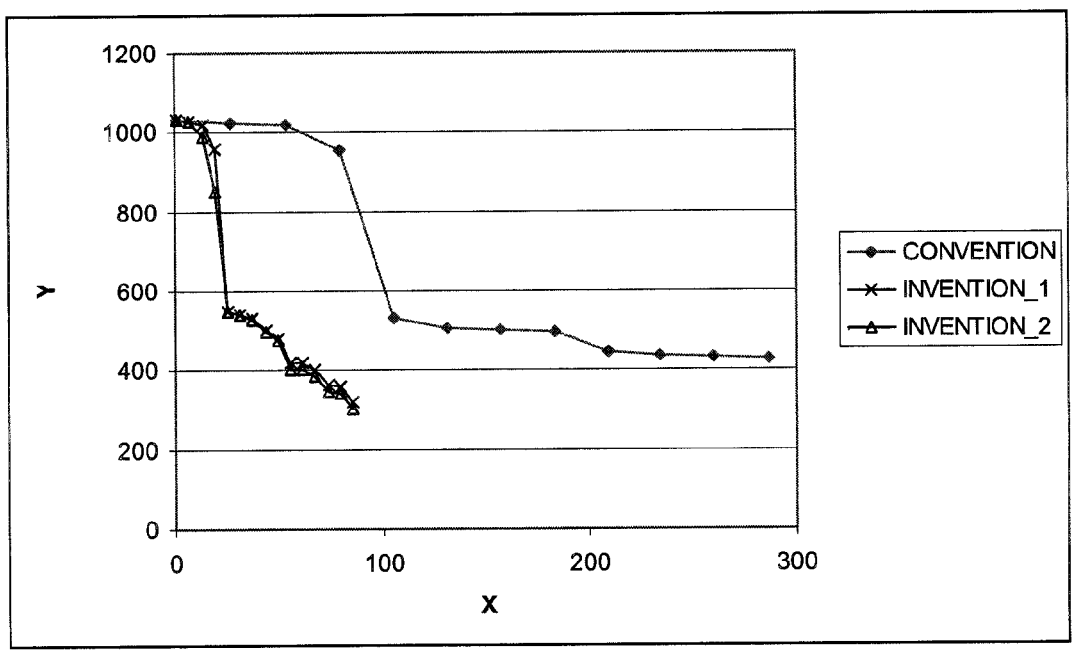
FIG. 12 shows the comparison of the objective function for the conventional method (CONVENTION), the method according to the invention using the perturbation matrix of Table 2 (INVENTION_1) and the method according to the invention using the selected perturbation matrix (INVENTION_2).

FIG. 12 shows the comparison of the objective function for the conventional method (CONVENTION). The method according to the invention uses the perturbation matrix of Table 2 (INVENTION_1) and the method according to the invention uses the selected perturbation matrix (INVENTION_2). The X axis is the number of simulations and Y axis is the value of the objective function.

TABLE 2

Perturbation plan

| Perturbation | $\lambda_{P1}$ | $\lambda_{P2}$ | $\lambda_{P3}$ | $\lambda_{P4}$ | $\lambda_{P5}$ | $\lambda_{P6}$ | $\lambda_{P7}$ | $\lambda_{P8}$ | $\lambda_{P9}$ | $\lambda_{P10}$ | $\lambda_{P11}$ | $\lambda_{P12}$ | $\lambda_{P13}$ | $\lambda_{I1}$ | $\lambda_{I2}$ | $\lambda_{I3}$ | $\lambda_{I4}$ | $\lambda_{I5}$ | $\lambda_{I6}$ | $\lambda_{I7}$ | $\lambda_{I8}$ | $\lambda_{I9}$ | $\lambda_{I10}$ | $\lambda_{I11}$ | $\lambda_{I12}$ |
|---|---|---|---|---|---|---|---|---|---|---|---|---|---|---|---|---|---|---|---|---|---|---|---|---|---|
| 1 | X |   |   | X | X |   |   | X | X |   |   |   |   | X | X |   |   | X | X |   |   |   |   |   | X |
| 2 |   | X | X |   |   | X | X |   |   | X | X |   |   |   | X | X |   |   |   | X | X |   |   |   |   |
| 3 |   |   | X | X |   |   |   | X | X | X |   |   |   | X | X | X |   |   |   |   |   |   | X | X |   |
| 4 | X | X | X |   |   |   | X | X |   |   | X | X |   |   |   |   | X | X | X |   |   |   |   |   |   |
| 5 |   | X |   |   | X | X | X |   |   |   | X |   |   |   | X |   | X | X |   | X |   |   |   |   |   |

Figure 4:
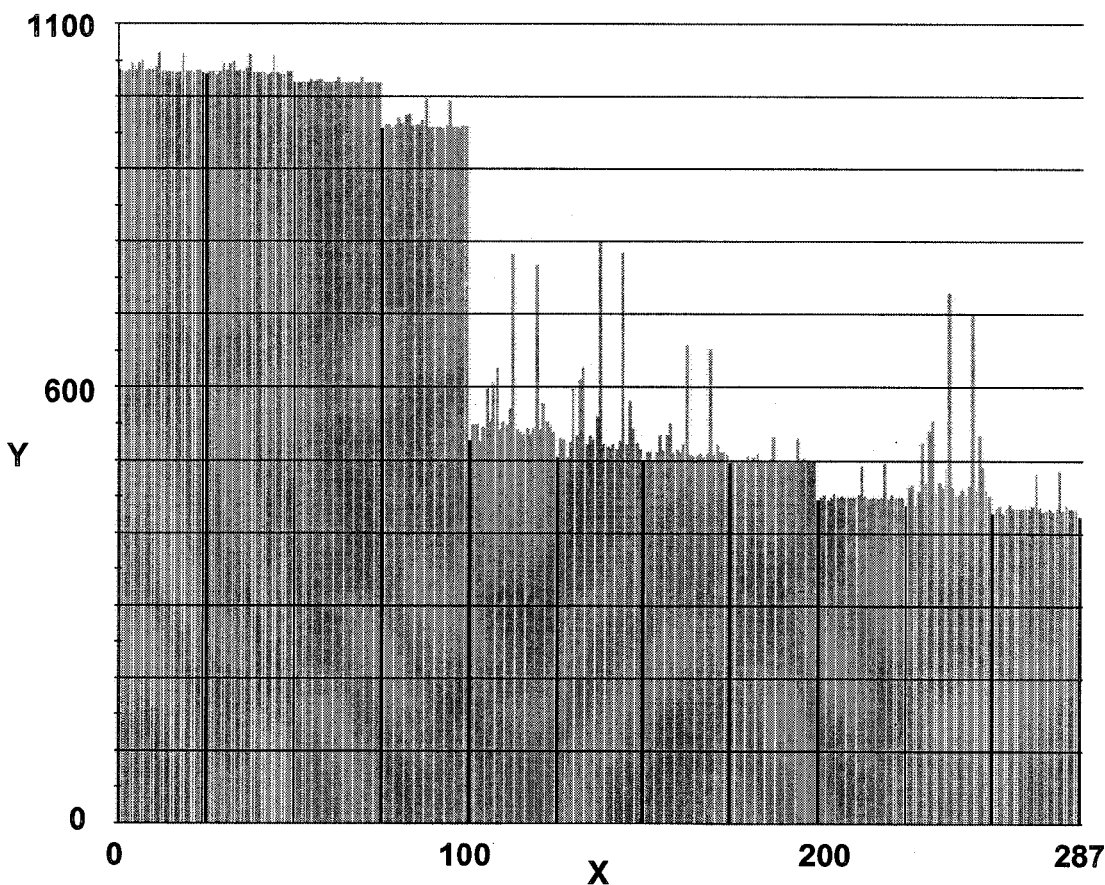
FIG. 4 shows the variation of the objective function in the optimization procedure with the conventional approach. Axis X corresponds to the number of simulations for evaluating the objective function and axis Y represents the value of the objective function.
Figure 5:
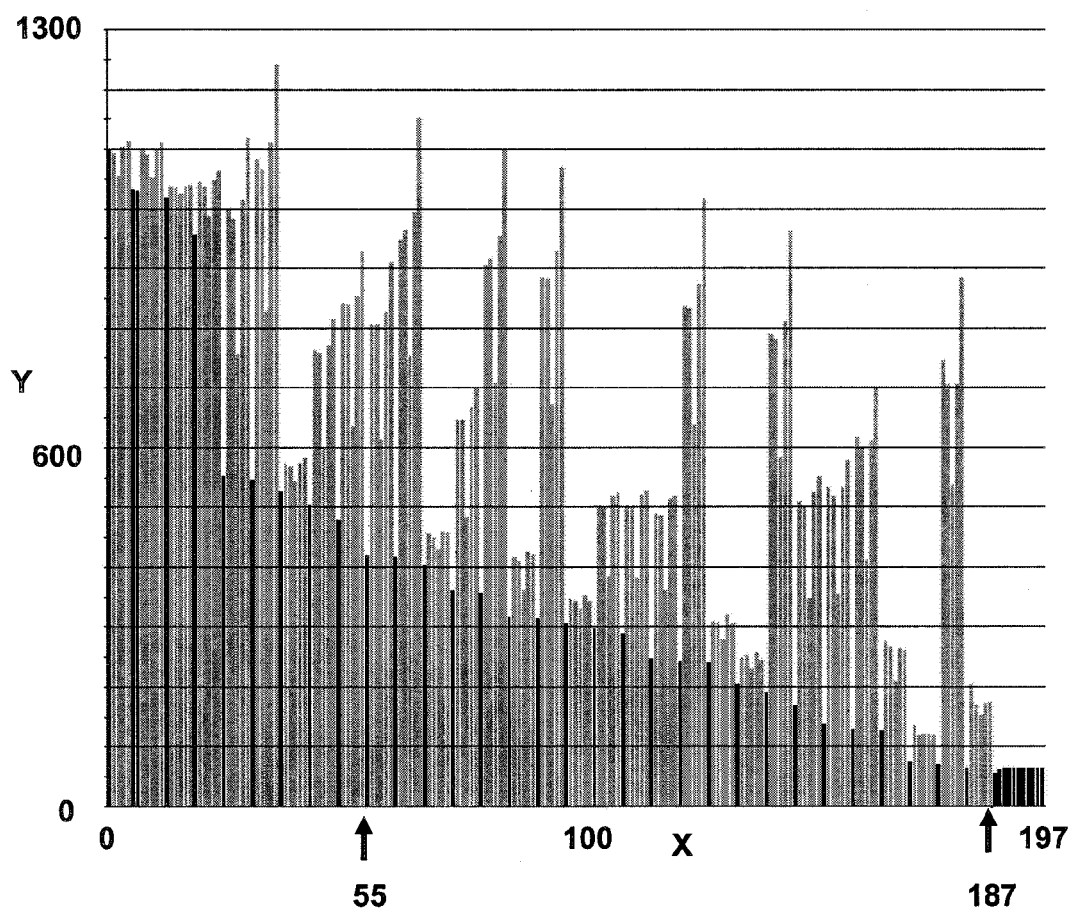
FIG. 5 shows the variation of the objective function in the optimization procedure with the method according to the invention. Axis X corresponds to the number of simulations for evaluating the objective function and axis Y represents the value of the objective function.

The global objective function is minimized using an optimization procedure based on the gradient method in order to optimize the 25 parameters. The objective function value for the initial model is 1031. The variation of the objective function with the conventional approach, which calculates the derivatives with 25 perturbations, is illustrated in FIG. 4. Axis X corresponds to the number of simulations. In total, 287 simulations are carried out, and the optimum objective function is 422 for the 287$^{th}$ simulation (this model is denoted by CONVENTION_287). The objective function as a function of the number of simulations with the method of the invention is illustrated in FIG. 5. In total, 197 simulations are carried out, and the minimum value of 54 is obtained for the 187$^{th}$ simulation (this model is denoted by INVENTION_187). It can also be noted that the objective function is reduced to 418 at the 55$^{th}$ simulation (this model is denoted by INVENTION_55), which means that a model of identical quality can be obtained (same objective function values) in relation to the optimum model obtained with the conventional approach (CONVENTION_287) with 5 times fewer simulations. This result is coherent with the theoretical analysis because 5 perturbations are used instead of 25 for the conventional approach and the number of perturbations (simulations) to calculate the derivatives can be reduced by a factor of 5. With the method proposed, the saving in CPU time and engineer time devoted to the study of a reservoir is significant.

Figure 6:
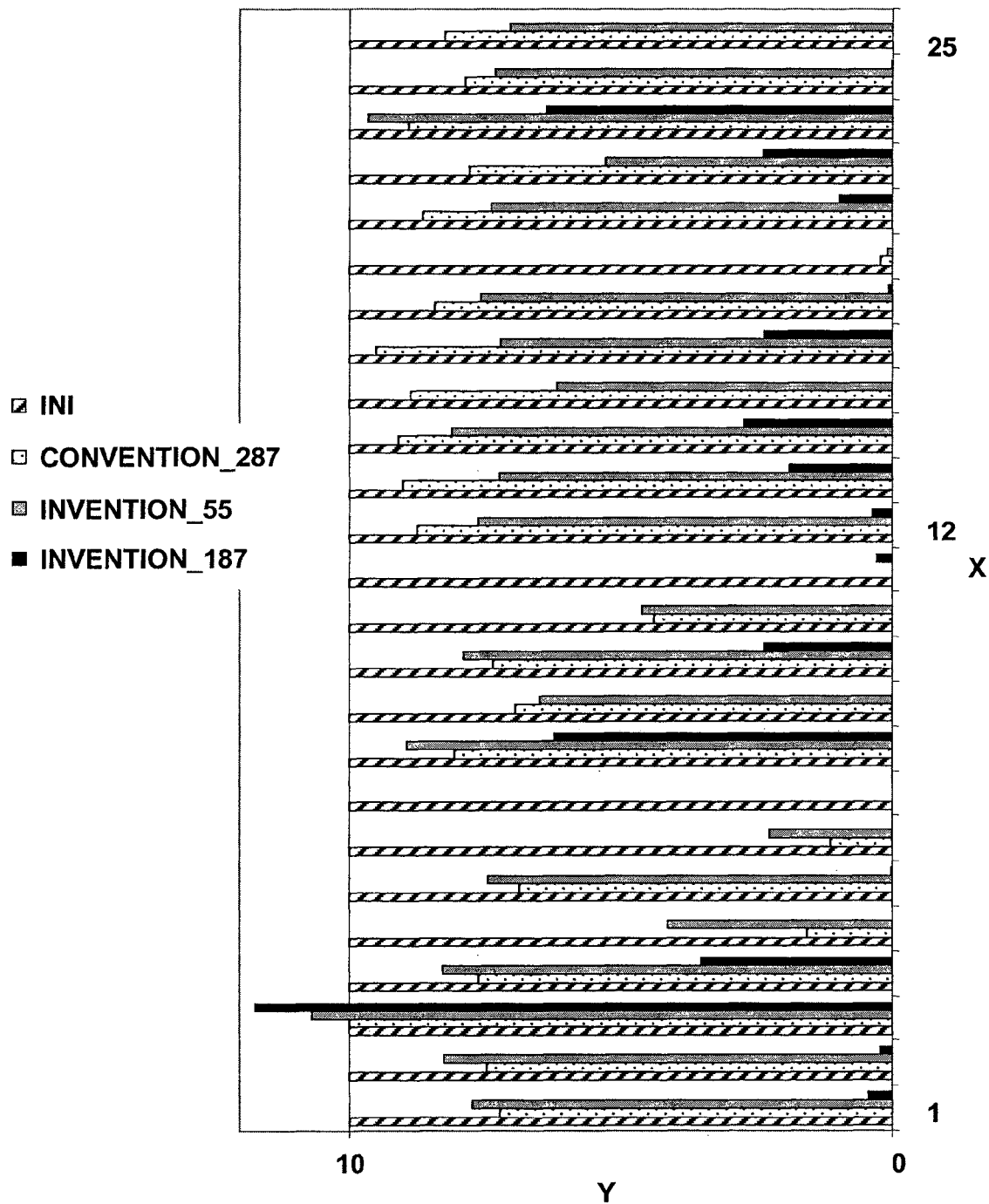
FIG. 6 shows the errors on the parameters of the various models. INI represents the initial model. CONVENTION_287 represents the optimum model ($287^{th}$ model) with the conventional optimization. INVENTION_55 is the $55^{th}$ model in the optimization with the method according to the invention. INVENTION_187 is the optimum model ($187^{th}$ model) with the method according to the invention. Axis X is the parameter number and axis Y is the error on the parameter (skin value)
Figure 7A:
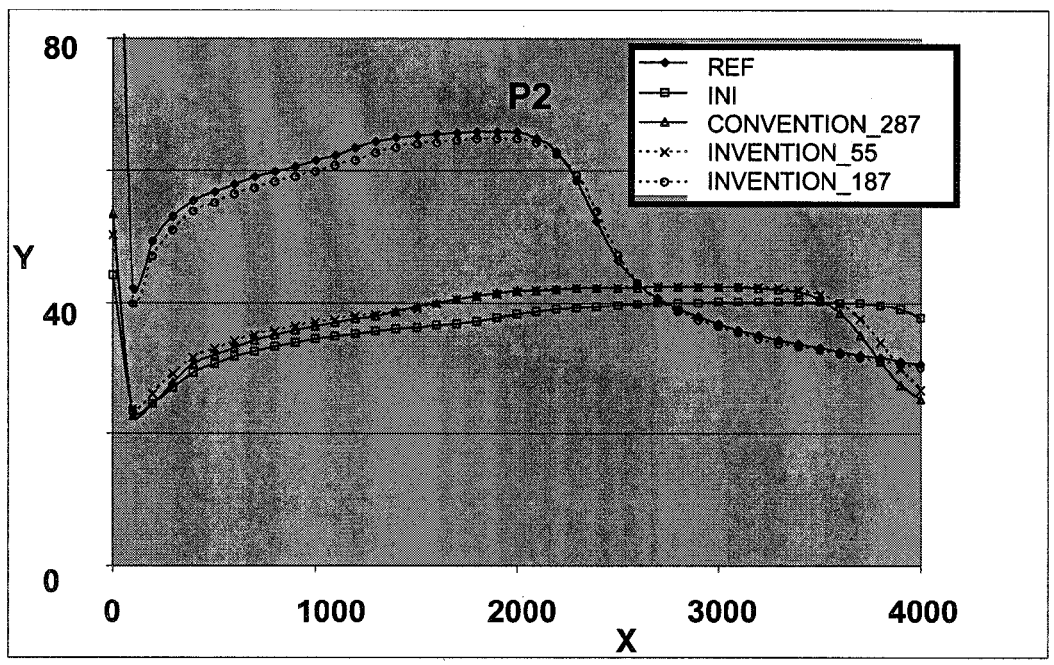
FIG. 7a shows the oil production comparisons in well P2 for various models. REF is the reference solution representing the measured data. INI represents the initial model. CON- VENTION_287 represents the optimum model (287$^{th}$ model) with the conventional optimization. INVENTION_55 is the 55$^{th}$ model in the optimization with the method according to the invention. INVENTION_187 is the optimum model (187$^{th}$ model) with the method according to the invention. Axis X is the time in days and axis Y is the oil production in m$^3$/day.
Figure 7B:
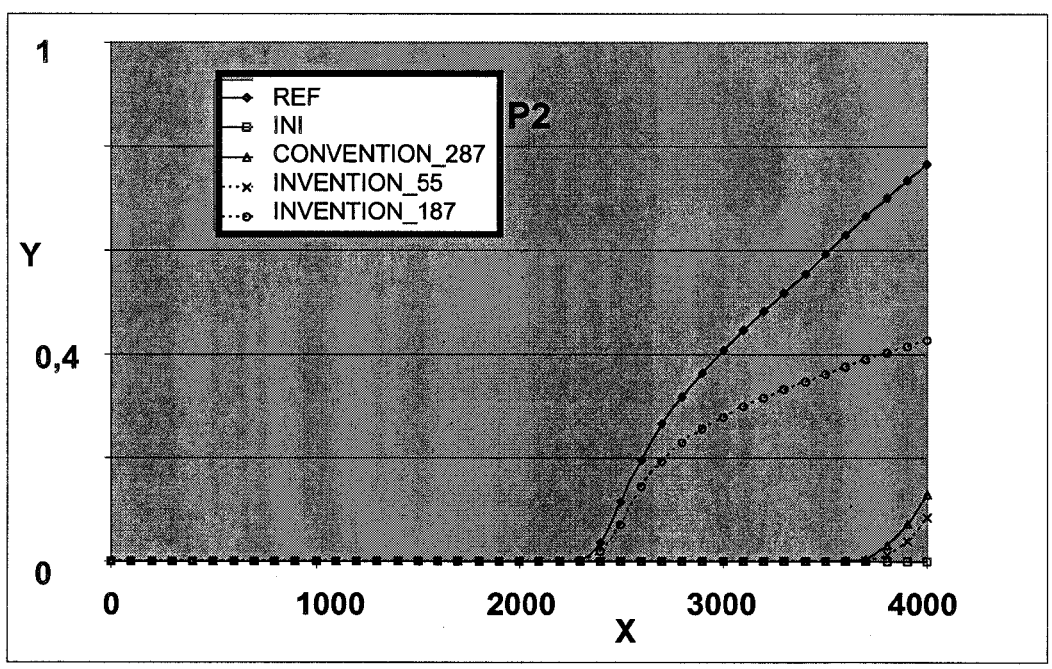
FIG. 7b shows the water cut comparisons in well P2 for various models. Axis X is the time in days and axis Y is the unitless water cut.
Figure 8A:
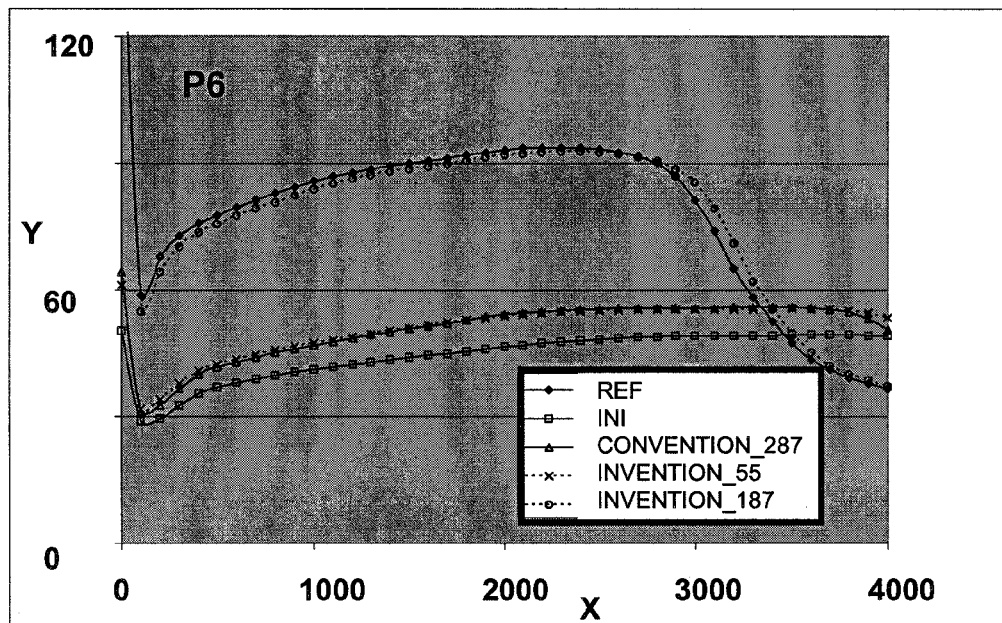
FIG. 8a shows the oil production comparisons in well P6 for various models. Axis X is the time in days and axis Y is the oil production in m$^3$/day.
Figure 8B:
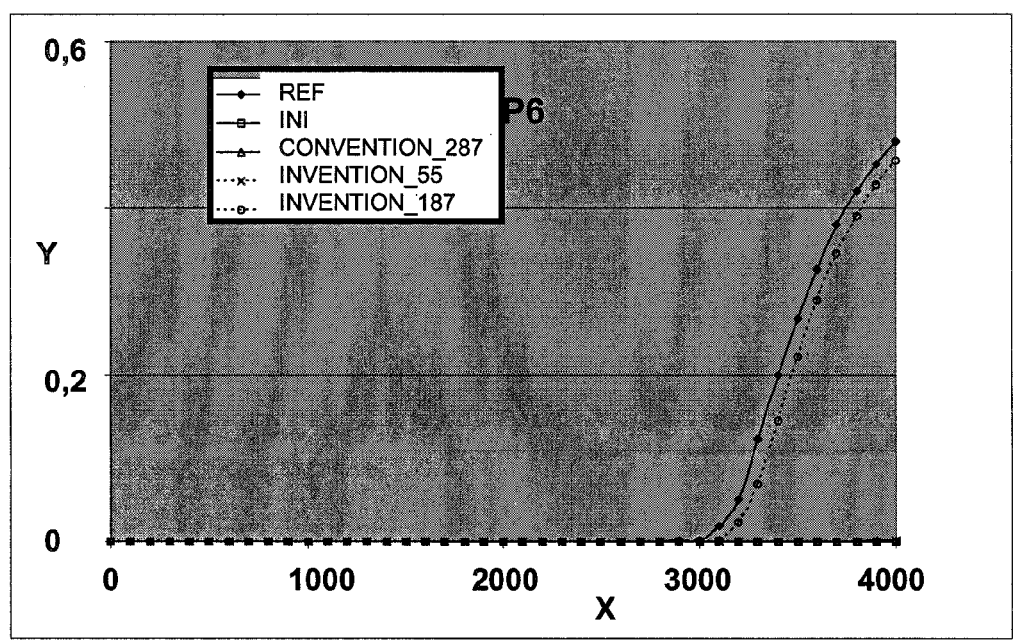
FIG. 8b shows the water cut comparisons in well P6. Axis X is the time in days and axis Y is a unitless water cut datum.
Figure 9A:
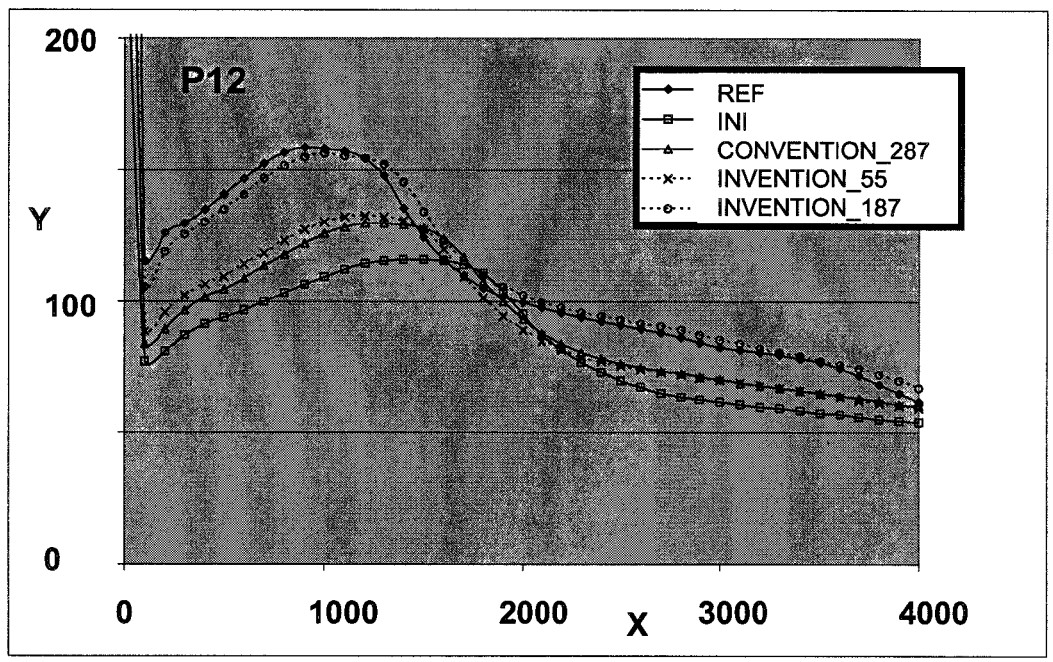
FIG. 9a shows the oil production comparisons in well P12. Axis X is the time in days and axis Y is the oil production in m$^3$/day.
Figure 9B:
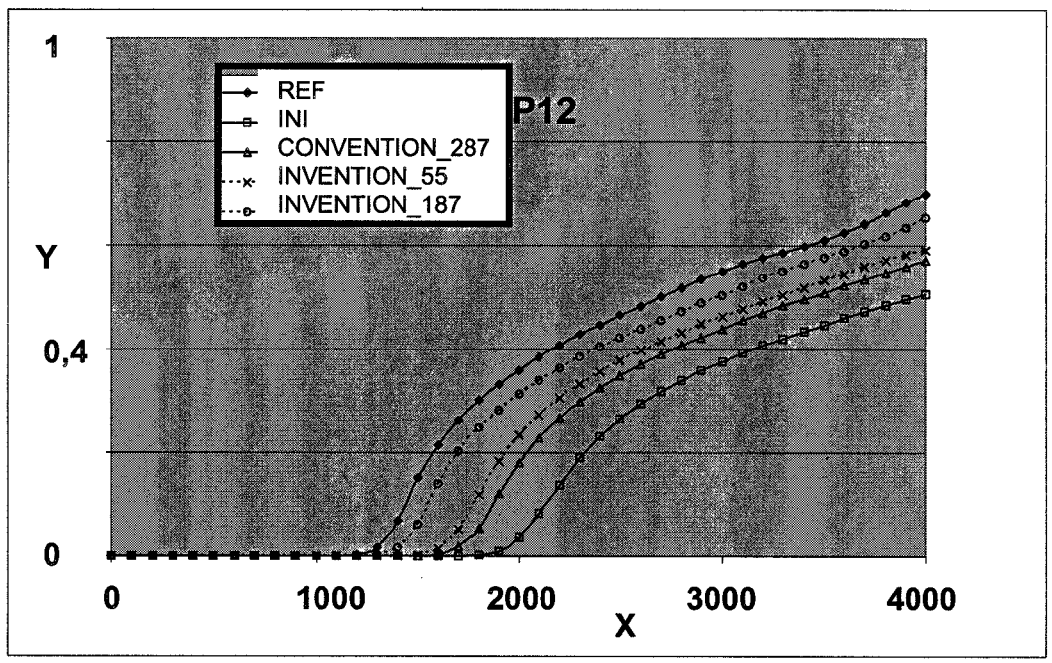
FIG. 9b shows the water cut comparisons in well P12. Axis X is the time in days and axis Y is the unitless water cut.
Figure 10:
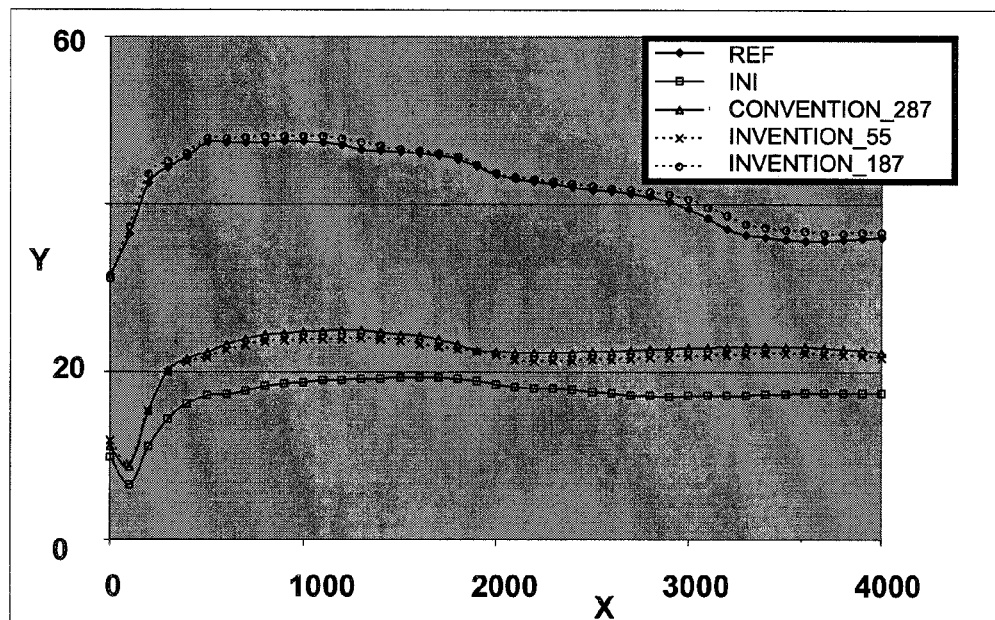
FIG. 10 shows the water injection comparisons in well 16 for various models. Axis X is the time in days and axis Y is the water production in m$^3$/day.
Figure 11:
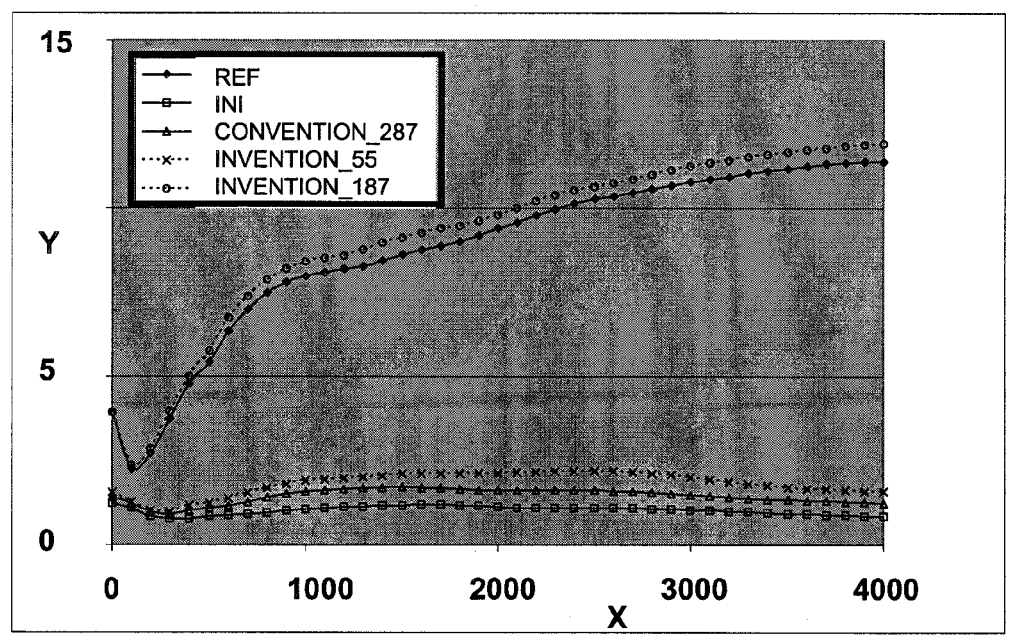
FIG. 11 shows the water injection comparisons in well 12 for various models. Axis X is the time in days and axis Y is the water production in m$^3$/day.

The absolute errors on the parameters (skins) are given in FIG. 6 for the initial model and for some improved models (CONVENTION_287, INVENTION_55 and INVENTION_187). Models CONVENTION_287 and INVENTION_55 give results that are rather close and reduce the errors in relation to the initial model. Error reductions are however limited. With the optimum model of the method according to the invention, INVENTION_187, the results are clearly better.

FIGS. 7a to 11 show the results of simulations on some wells (P2, P6, P12 and I6, I12). It can be considered that the results are equivalent for models CONVENTION_287 and INVENTION_55, which slightly reduce the errors. However, the optimum model obtained by the method according to the invention, INVENTION_187, still gives markedly better results. With this method, a better model can be obtained with less simulations.

The results of the two perturbation matrices are very close, better than those of the conventional method (INVENTION_1 and INVENTION_2 reduce the objective function with much fewer simulations). However, the matrix of INVENTION_1 can only be used for this particular field because the well configuration is known (the wells are well aligned, an injection well is surrounded by 4 production wells and a production well is surrounded by 4 injection wells). The matrix of INVENTION_2 is general and there is no need to know the particular configuration of the wells. This matrix can therefore be used in any case.

The parameters of this example being skins, the method allows determination of the skin values for the 25 wells. It is thus possible to modify the development strategy by determining technical parameters. For example, if the skin value is too great in a well, a volume of acid is injected to stimulate this well so as to improve the production thereof. The amount of acid injected can be determined according to the skin value.

The invention claimed is:

1. A method of developing a petroleum reservoir from a computer-based reservoir model including a set of grid cells to which values of parameters obtained from measurements within the petroleum reservoir are assigned, comprising:
    defining with the computer-based reservoir model, according to the parameters, a global objective function measuring differences between measured historical data values and simulated historical data values;
    processing the global objective function into a sum of local objective functions with each local objective function measuring the differences over a geographic region of the reservoir and being defined from parameters having an impact on the historical data corresponding to each region with the parameters having an impact being selected from among the parameters obtained from the measurements and each region being determined to minimize a number of parameters having an impact;
    modifying the values by minimizing the global objective function by a gradient method wherein derivatives of the local objective functions relative to the parameters having an impact are estimated by parameter perturbation based on a perturbation matrix having a rank equal to a number of the parameters having an impact of the local objective function; and developing the reservoir using the reservoir model.

2. A method as claimed in claim 1, wherein the parameters having an impact are selected by a sensitivity analysis for each local objective function.

3. A method as claimed in claim 1, wherein the perturbations are carried out with different values for identical parameters.

4. A method as claimed in claim 2, wherein the perturbations are carried out with different values for identical parameters.

5. A method as claimed in claim 1, wherein the historical data are production data obtained from measurements in wells in response to a production of the reservoir and/or repetitive seismic data.

6. A method as claimed in claim 2, wherein the historical data are production data obtained from measurements in wells in response to a production of the reservoir and/or repetitive seismic data.

7. A method as claimed in claim 3, wherein the historical data are production data obtained from measurements in wells in response to a production of the reservoir and/or repetitive seismic data.

8. A method as claimed in claim 4, wherein the historical data are production data obtained from measurements in wells in response to a production of the reservoir and/or repetitive seismic data.

9. A method as claimed in claim 5, wherein the production data are selected from: data pertaining to oil production, gas production, well water production, gas/oil ratio, water cut, pressure, temperature, and hydrocarbon composition.

10. A method as claimed in claim 5, wherein the production data are selected from: data pertaining to oil production, gas production, well water production, gas/oil ratio, water cut, pressure, temperature, and hydrocarbon composition.

11. A method as claimed in claim 6, wherein the production data are selected from: data pertaining to oil production, gas production, well water production, gas/oil ratio, water cut, pressure, temperature, and hydrocarbon composition.

12. A method as claimed in claim 7, wherein the production data are selected from: data pertaining to oil production, gas production, well water production, gas/oil ratio, water cut, pressure, temperature, and hydrocarbon composition.

13. A method as claimed in claim 8, wherein the production data are selected from: data pertaining to oil production, gas production, well water production, gas/oil ratio, water cut, pressure, temperature, and hydrocarbon composition.

14. A method as claimed in claim 1, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

15. A method as claimed in claim 2, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

16. A method as claimed in claim 3, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

17. A method as claimed in claim 4, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

18. A method as claimed in claim 5, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

19. A method as claimed in claim 6, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

20. A method as claimed in claim 7, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

21. A method as claimed in claim 8, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

22. A method as claimed in claim 9, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

23. A method as claimed in claim 10, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

24. A method as claimed in claim 11, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

25. A method as claimed in claim 12, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

26. A method as claimed in claim 13, wherein the parameters obtained from measurement are selected from: petrophysical properties including permeability, porosity, relative permeabilities and capillary pressures, petro-elastic properties, spatial distribution of facies, damage around a well, a well connectivity index, fault connections, throws, or structural parameters.

27. A method as claimed in claim 1, wherein coefficients of the perturbation matrix are determined by a method comprising:

i. reducing a number of coefficients to be generated by applying an identical coefficient for a given perturbation to all the parameters involved in a single local objective function;
  ii. generating randomly coefficients of the perturbation matrix with respect to i; and
  iii. modifying the coefficients to minimize an error in estimation of derivatives of the local objective functions with respect to parameters having an impact.

28. A method as claimed in claim 27, wherein an error $\epsilon_{tot}$ is calculated by a formula:

$$\varepsilon_{tot} = \sum_{k=1}^{N_{reg}} \sum_{j=1}^{m_k} (D_j H_{mk} - 2m_k)^2$$

with:
Nreg being a number of local objective functions,
$D_j H_{mk}$ being a numerical derivative of $H_{mk}$ with respect to a parameter $\lambda_{k,j} \lambda_{k,j}$; and $$H_{mk}(\lambda_{k,1}, \lambda_{k,2}, \dots, \lambda_{k,m_k}) = \sum_{j=1}^{m_k} \sum_{i=1}^{m_k} \lambda_{k,i} \lambda_{k,j}$$

and
mk being the number of parameters,
$H_{mk}$ being a test function, and
$\lambda_{k,j}$ is a parameter of the objective function.

* * * * *